United States Patent [19]
Allington

[11] 3,855,111
[45] Dec. 17, 1974

[54] ELECTROPHORESIS APPARATUS

[75] Inventor: William B. Allington, Lincoln, Nebr.

[73] Assignee: Instrumentation Specialties Company, Lincoln, Nebr.

[22] Filed: Oct. 30, 1973

[21] Appl. No.: 411,144

Related U.S. Application Data

[60] Division of Ser. No. 344,144, March 23, 1973, Pat. No. 3,795,600, which is a continuation-in-part of Ser. No. 226,016, Feb. 14, 1972.

[52] U.S. Cl............ 204/299, 204/180 R, 204/180 G
[51] Int. Cl............................................. B01k 5/00
[58] Field of Search............ 204/180 R, 180 G, 299

[56] References Cited
UNITED STATES PATENTS

| | | | |
|---|---|---|---|
| 3,290,240 | 12/1966 | Neren | 204/299 |
| 3,346,479 | 10/1967 | Natelson | 204/301 |
| 3,384,564 | 5/1968 | Ornstein et al. | 204/180 G |
| 3,553,097 | 1/1971 | Buchler | 204/299 |
| 3,704,217 | 11/1972 | Nerenberg | 204/180 G |

Primary Examiner—H. S. Williams
Assistant Examiner—A. C. Prescott
Attorney, Agent, or Firm—Vincent L. Carney

[57] ABSTRACT

To prepare electrophoresis apparatus for operation, a wire mesh and an expandable plug are inserted into a first of two sections of a housing for two different anti-convection media and an unpolymerized gel is pipetted above the expandable plug into the first section, with the first section being inverted and the wire mesh being above the plug. When the unpolymerized gel reaches a level slightly above the mesh, it is polymerized with another plug or a layer of water above it to cause it to have a smooth surface extending beyond the wire mesh. The first and second housings are then fastened together with the gel in the first section above the second section and a density gradient column is formed in the second section in contact with the gel. After the different molecular species have been electrophoresed from the gel into the density gradient column, the second section is removed and the liquid in the density gradient column is moved by bulk flow past a scanning device which may scan it with different frequencies during successive motions of the liquid, the liquid being returned and the second section refastened to the first section for further electrophoresis if the scanning indicates the desirability of further electrophoresis.

12 Claims, 7 Drawing Figures

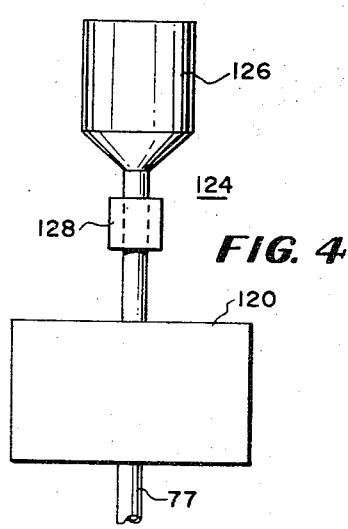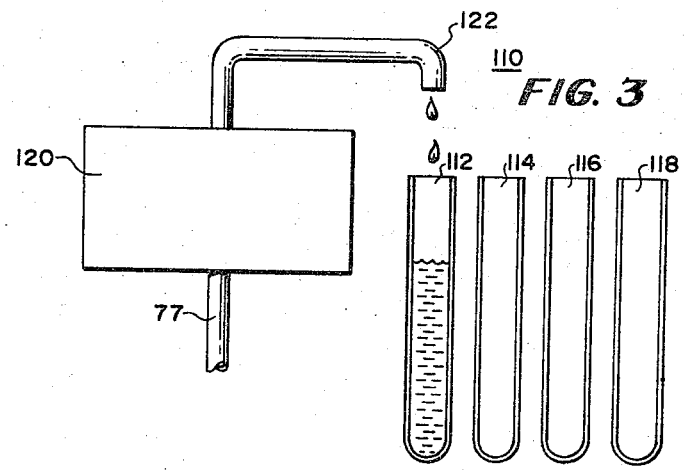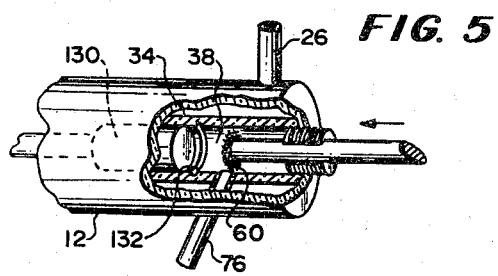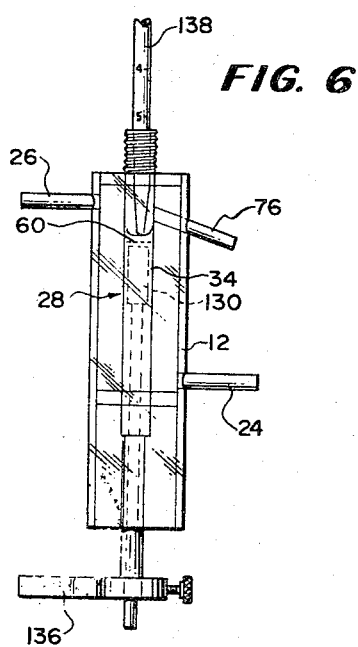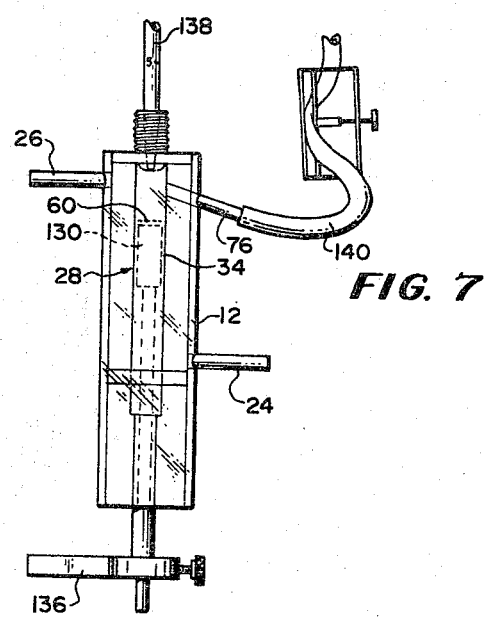

ELECTROPHORESIS APPARATUS

This is a division, of application Ser. No. 344,144, filed Mar. 23, 1973, now U.S. Pat. No. 3,795,600 which is a continuation-in-part of application Ser. No. 226,016 filed Feb. 14. 1972.

In one technique of electrophoresis, different molecular species of a sample are separated by electrophoresing the sample through two anticonvection media in series, the first medium being a gel and the second medium having good bulk flow characteristics, with the first medium serving primarily to separate the different molecular species and the second medium serving to enable the different molecular species to be moved by bulk flow of the medium.

In a prior art apparatus and method using this technique, the first medium and the second medium are located in a U-tube, with the second medium being a density gradient column in the lower portion of the U-tube and the first medium being a gel closing the legs of the U-tube. After the different molecular species have been separated in the gel and electrophoresed into the density gradient column, they are floated from the U-tube by inserting a dense liquid in one arm of the U-tube.

The prior art technique has the disadvantage of not permitting adequate monitoring of the separated molecular species before they are removed from the U-tube.

In the parent application of this application, a technique is described which permits the scanning of the separated molecular species by floating the density gradient column or other anticonvection medium having bulk flow characteristics upward past a concentration sensing device by inserting a dense liquid into the bottom of the medium and returning the medium back into position by removing the dense liquid. The housing containing the first and second media are separable so that the first medium may be removed to permit the convenient scanning of the second medium.

While the method and apparatus disclosed in U.S. patent application Ser. No. 226,016 works in a generally satisfactory manner, it is desirable to improve upon it by providing a convenient technique for inserting the first and second media and a better technique for scanning the second medium more fully.

Accordingly, it is an object of the invention to provide a novel apparatus for electrophoresis.

It is a still further object of the invention to provide a novel method for electrophoresis.

It is a still further object of the invention to provide a novel technique for preparing electrophoresis apparatuses for use.

It is a still further object of the invention to provide a novel housing for electrophoresis apparatus.

It is a still further object of the invention to provide a novel technique for electrophoresis, which technique includes close monitoring of the process.

It is a still further object of the invention to provide a technique for repeated scanning of separated molecular species with different frequencies of light during the separation of the species by electrophoresis.

In accordance with the above and further objects of the invention, different species of molecules are separated into zones, each including one or more different molecular species, from a mixture of molecular species by electrophoresing the species in two different media in succession. The first of the two media hereinafter called a separating medium, is a solid or semisolid which serves primarily to separate the molecular species into different zones and the second medium, hereinafter called a collecting medium, is capable of bulk flow so as to serve primarily as a good medium for collecting the zones in different containers, with the separated zones being moved from one medium to the other by electrophoresis.

The first medium is in a first tubular section of a two-section tubular housing, which first section includes an internal annular groove near its bottom end adapted to receive a plastic mesh which holds a gel. The second tubular section of the housing is adapted to contain the second medium which has better flow characteristics than the first medium, with the second medium being held within the second section by a semipermeable membrane fastened to the bottom of a second section. The first and second sections may be fastened together with the two media in intimate contact.

To prepare the first section and first medium, the mesh is inserted in one end of the section and pushed until it snaps into the internal annular groove which holds it in place. Then the section is inverted over an expandable plug which has a smooth surface that seals the bottom of the inverted section which will be the top of the first medium. Unpolymerized gel is then pipetted through the mesh until it flows over the mesh and the surface adjacent to the mesh is coated with water or pressed with a flat-surfaced plastic plug so that it will be smooth and above the mesh, after which the gel is polymerized by methods known in the art to solidify it in place where it will be held by the mesh and have smooth top and smooth bottom surfaces.

The first and second sections are fastened together after the gel is in place and the second medium is applied to the second section. The second medium may advantageously be a sucrose density gradient column which may be applied by a density gradient mixer in the manner known in the art. A side tube extending upwardly from the second section holds sufficient volume of second medium to insure that the second medium never falls to a level where it is not in contact with the first medium.

During the electrophoresing of a sample of different molecular species from the top of the first medium and into the second medium, the zones of separated molecular species that have entered the second medium may be scanned to monitor the electrophoresis process. They may be scanned several times with different frequencies where this is useful.

To scan the separated molecular species in the second medium, a dense liquid, more dense than the second medium, is inserted by a reversible pump into the bottom of the second medium to float the second medium past a concentration scanning device which scans the medium to locate the zones of different molecular species. This is usually done after the second section has been separated from the first section. To return the medium for further electrophoresis or to make another scanning operation at a second frequency, the dense liquid is withdrawn by the reversible pump to return the second medium to its original location. It may then be floated past the optical density sensing device for scanning by a different frequency of light of desired or further electrophoresis may be performed after reconnecting the first and second sections if they have been separated.

When the separation is sufficiently complete, each zone of the collecting medium is deposited in a different container by a conventional fraction collector that: (1) senses the different zones from differences in their ultraviolet light absorbances as the collecting medium flows to a downspout; and (2) moves different containers under the downspout to receive different zones that it has sensed.

With this structure, the electrphoresis apparatus of this invention has the advantages of: (1) enabling the easy assembly of the gel to the first section; (2) providing a smooth interface between the two media; and (3) enabling convenient disassembly of the two sections for scanning and collection of the second medium and the convenient assembly for further electrophoresis if necessary. Moreover, the ability to scan the second medium with different frequencies of light provides versatility in the use of the apparatus.

The above and other features of the invention will be better understood from the following detailed description when considered with reference to the accompanying drawings, in which:

FIG. 3 is a fragmentary, elevational, diagrammatic view of a portion of an electrophoresis apparatus forming an embodiment of the invention;

FIG. 4 is a fragmentary, elevational, diagrammatic view of a portion of an electrophoresis apparatus forming another embodiment of the invention that may be included with or instead of the embodiment shown in FIG. 3; and FIGS. 5-7 are schematic diagrams illustrating three steps in the assembly of a gel into the electrophoresis apparatus shown in FIG. 2.

GENERAL METHOD

Figure 1:
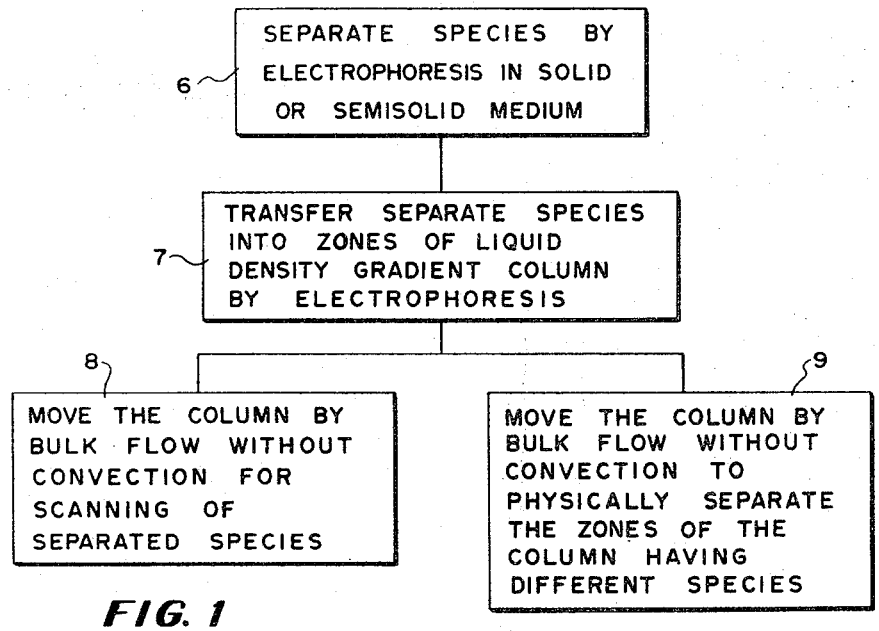
FIG. 1 is a block diagram illustrating the steps of an electrophoresis process in accordance with an embodiment of the invention.

In FIG. 1, there is shown a block diagram broadly illustrating two sequences of steps in accordance with the invention, with both sequences of steps resulting in the separating of different molecular species or chemical components of a mixture of molecular species or chemical compounds, one of the sequences of steps permitting the convenient observation of the separated molecular species after their separation and the other sequence permitting the convenient collection of the separated molecular species after their separation.

As illustrated at 6 in FIG. 1, the first step in observing or collecting the different molecular species from the mixture of molecular species in accordance with the invention is to separate the species by gel electrophoresis. The process of this invention is intended to be used to separate molecular species which can be separated better by electrophoresis in a solid or semisolid medium than by electrophoresis in a liquid density gradient column. This characteristic is true of many different molecular species that have some similarities or are considered closely spaced molecularly so as to benefit from the higher resolution available from electrophoresis in certain solid media.

Several solid and semisolid media that provide superior separation for some closely spaced molecular species are known, such as for example, polyacrylamide gels, dextran particles, cellulose and agarose gels. A medium of this type, when used to perform the first step illustrated in FIG. 1, will hereinafter be referred to as the separating medium. The process and apparatus of this invention have particular utility when the most suitable separating medium is a solid or semisolid so as to make the collection of the individual species difficult.

Broadly, materials suitable for the separating medium in practicing the first step illustrated in block 6 have the characteristics of: (1) being incapable of bulk flow or having poor bulk flow characteristics; (2) resisting convection; and (3) having physical, chemical or both physical and chemical interaction with the species to be separated, which interaction is reversible and provides the different rates of migration and different species. More specifically, they are typically solids or semisolids that have some special characteristic which enable them to provide high resolution of some closely-spaced molecular species during electrophoresis. A typical special characteristic is the ability to impede electrophoretic migration by molecular sieving. Because these special mediums are not capable of bulk flow or have poor bulk flow characteristics, it is difficult to collect the different species and, under some circumstances, to observe them after they are separated in the medium.

As illustrated at 7 in FIG. 1, the second step in observing or collecting the different molecular species from the mixture of molecular species in accordance with the invention is to transfer the separated molecular species into zones of a liquid density gradient column by electrophoresis. While in the preferred embodiment illustrated in FIG. 1, the species are transferred into a liquid density gradient column, the invention is broader than this. The second medium, which may be called a collecting medium to distinguish it from the separating medium used in the first step, is selected primarily for its ability to receive the separated molecular species and for the ease with which the separated molecular species are observed and collected into different containers when in this medium.

Broadly, the collecting medium is either liquid or granular and resists convection. It is typically a density gradient column.

A principal characteristic of the collecting medium is its ability to be moved by bulk flow. To have sufficient bulk flow characteristics, the collecting medium should be capable of being moved upwardly by the insertion of a more dense liquid beneath it without mixing the zones containing different molecular species. Preferably, the collecting medium has bulk flow characteristics that permit it to be moved from a lower reservoir to a higher reservoir through a tube that is narrower than the lower and higher reservoirs and returned to the lower reservoir by the injection and withdrawal of the dense liquid into and from the bottom of the lower reservoir without substantially altering its density gradient in the lower reservoir.

Some materials used as media in electrophoresis processes have more than one form or phase and the different forms or phases have different characteristics affecting their selection as separating or collecting media. For example, polyacrylamide may be granular, which is considered to be a semisolid herein, or may be solid, and if solid, may have different degrees of stiffness.

Moreover, some materials or forms of materials may, under some circumstances, serve as separating media and, under other circumstances, serve as collecting media. Some granular materials, such as dextran gel particles, are this type of material, being semisolids with bulk flow characteristics that permit collection of the species in fraction collectors of the type that require bulk flow but do not perform as well as other materials, such as liquid density gradient columns, during collection by such fraction collectors. Such materials may be used as a collecting medium when they provide some special benefit that justifies their selection over materials having better bulk flow characteristics and under other circumstances are used as a separating medium together with a collecting medium having better bulk flow characteristics.

To provide adequate bulk flow characteristics to columns of some granular separating media, a special technique is used. In this technique, the granules are not displaced from the column into the fraction collector but instead the liquid electrolyte around the granules is removed from the granules and channeled into the fraction collector together with the separated zones, either by draining the electrolyte and zones of molecular species from the bottom or displacing them in an upward direction by introducing a more dense liquid in the bottom of the column.

In performing the second step 7 of the processes illustrated in FIG. 1, the different molecular species are moved from the separating medium into the collecting medium as distinct zones so that, as the zones of each molecular species move from the separating medium to the collecting medium, the identity of each zone is preserved, with the molecular species continuing to be spaced apart in the collecting medium.

In one embodiment, the separating medium forms one vertical column, hereinafter called a separating column, and the collecting medium forms another column, hereinafter called a collecting column, continuous with the separating column, being either above or below the separating column. The zones are electrophoresed from one end of the separating column through the separating column, and into the collecting column in a direction perpendicular to the zones by a source of potential applied across both columns, with the two columns being electrically and physically in series, so that horizontal zones containing each molecular species are formed in the separating medium and moved one by one as discrete horizontal zones, spaced vertically from each other, into the density gradient column as the different molecular species migrate from one end of the separating column to positions in the collecting column.

In a second embodiment, the horizontal zones are formed in the separating medium and then moved simultaneously, in parallel, in a direction parallel to the zones, into the collecting medium. In this embodiment, the zones containing the different species are first formed by electrophoresis in the separating medium by a potential applied from the top to the bottom of the separating column and then the separating column is placed with one of its sides contiguous with the side of a collecting column to form a new path for the migration of the different molecular species into the collecting column in a new direction perpendicular to the previous direction by electrophoresis, with a potential being applied across the two columns, in series from an outer side of the separating column to an outer side of the collecting column.

In the second embodiment, the collecting medium is usually formed of a granular material such as dextran particles, which granular material exhibits suitable bulk flow characteristics. Several suitable granular materials, such as dextran particles and glass particles, are known. Of course, the choice of materials for the collecting medium in the first embodiment is greater than in the second embodiment and includes both liquid and granular materials.

When the second step illustrated at 7 in FIG. 1 has been performed and the zones of the different molecular species are in the collecting medium, either of two different additional steps or both of the two additional steps are performed in sequence. One step, illustrated at 8 in FIG. 1 is to observe the different species; the other step, illustrated at 9, is to collect the different species by physically separating them into different containers.

The zones are observed to determine the amount of separation between zones and the number of species that have been separated before attempting to collect the different species in separate containers. The collecting medium containing the zones is moved by bulk flow through an optical cell which measures light absorbance or some other characteristic that indicates changes in the chemical components. The movement of the collecting medium may be in any direction, with precautions being taken to prevent any turbulance that will disturb the bulk flow of the medium and the molecular species contained in it, and it may be moved back and forth in the optical cell for repeated scanning with the same frequency of light for each scan or with different frequencies of light.

To collect the different species, the collecting medium is moved by bulk flow through an orifice, with each portion of the collecting medium containing a different zone or each portion containing certain zones or groups of zones that are to be collected together being channeled into a different container. Several methods and apparatuses are known in the art for making this type of collection, one method and apparatus being disclosed in U.S. Pat. No. 3,161,639 and another being disclosed in U.S. Pat. No. 3,453,200.

ELECTROPHORESIS APPARATUS

Figure 2:
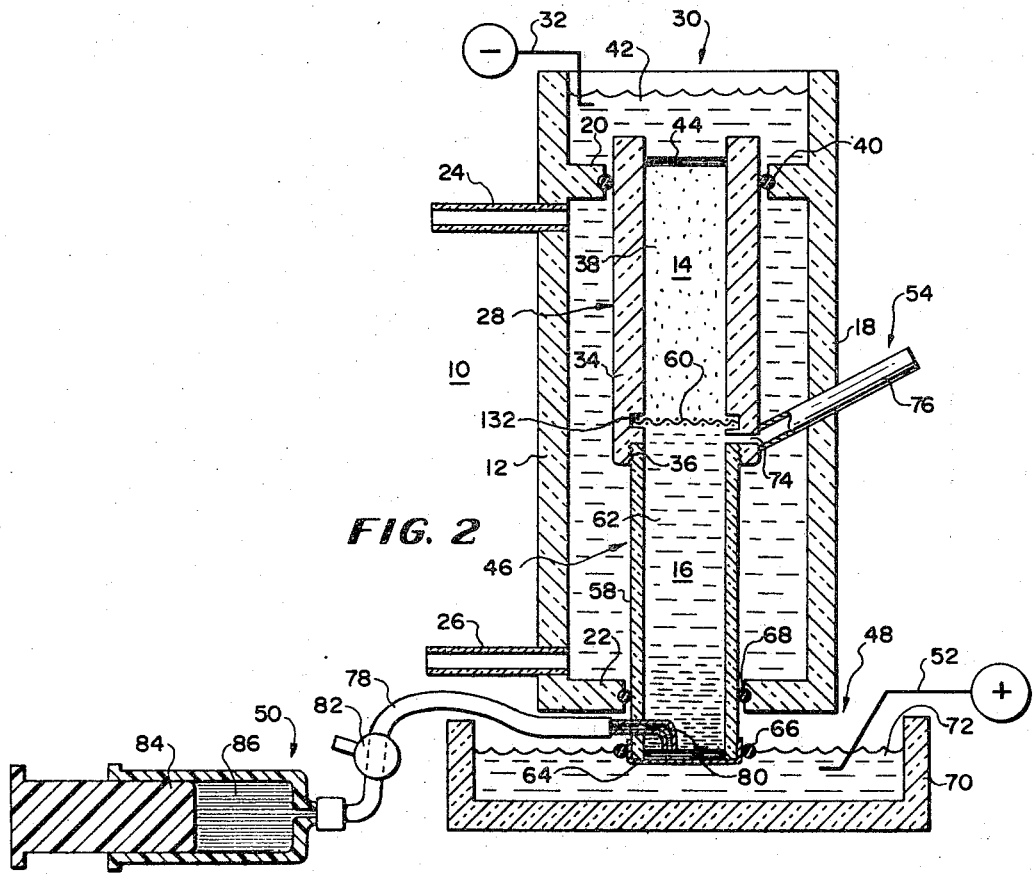
FIG. 2 is a fragmentary, elevational, sectional view, taken along a vertical axis of an electrophoresis apparatus that includes one embodiment of the invention.

In FIG. 2, there is shown in a sectional view an electrophoresis apparatus 10 having as its principal parts a tubular frame 12 and a collecting section 16 mounted in the lower part of the tubular frame 12.

To support the separating section 14 and the collecting section 16 of the electrophoresis apparatus 10, the tubular frame 12 includes a smooth cylindrical outer surface 18 adapted to be clamped in any suitable clamping apparatus (not shown) to hold the frame 12 in a vertical position, a first inwardy extending flange 20 located inside of the frame near its upper end to define a first circular opening for receiving a portion of the separating section 14, and a bottom inwardly extending flange 22 defining a second circular opening for receiving a portion of the collecting section 16, the first and second circular openings being coaxial with the frame, with the first circular opening having a larger diameter than the second circular opening.

To cool the separating section 14 and the collecting section 16, the inner walls of the frame 12 define a water jacket having a first tabulation 24 extending radially through the wall of the frame at one end just below the upper flange 20 and a second tabulation 26 extending radially through the wall at the other end just above the second inwardly extending flange 22 to enable a coolant to be pumped through the second tabulation 26, upwardly through the frame 12 around portions of the separating and collecting section 14 and 16 and out of the first tubulation 24.

The separating section 14 includes a cylindrical separating column 28, an upper buffer solution section 30 and a source of electrical potential 32 having a negative polarity.

The cylindrical separating column 28 includes an upper cylindrical tube 34 extending through the first circular opening at its upper end and being internally threaded at its lower end to engage the collecting section 16 at 36, with a column of solid or semisolid separating medium 38 being within and substantially filling the upper cylindrical tube 34. An o-ring 40 seals the outer surface of the cylindrical upper tube 34 against the first inwardly extending flange 20 and supports the separating column 28 and a porous screen 60 rests in an annular internal groove 132 near the bottom of the tube 34 to hold the separating medium 38 in place. In this position, the lower portion of the separating column 28 is surrounded by the coolant below the first flange 20 and the upper portion of the separating column 28 extends above the first flange 20 into the buffer section 30.

To provide one electrical connection to a source of electrical potential for electrophoresis, the buffer section 30 contains a buffer solution 42 and an electrode connecting the source of potential 32 to the buffer solution with the buffer solution 42 being retained within a compartment defined by a portion of the cylindrical walls of the frame 12, the top surface of the first inwardly extending flange 20 of the frame 12, the o-ring 40, a portion of the upper cylindrical tube 34 and the top of the separating medium 38. A sample 44 containing a mixture of molecular species that are to be separated is suspended in a liquid more dense than the buffer solution and supported directly on top of the separating medium 38.

The collecting section 16 includes a cylindrical collecting column 46, a lower buffer solution section 48, a fluid control section 50, a source 52 of positive potential, and a fluid exit section 54.

The cylindrical collecting column 46 includes a lower cylindrical tube 58 having its central opening aligned with the central opening of the upper cylindrical tube 34 of the separating column 28, a collecting medium 62 within the lower cylindrical tube 58 and beneath the porous screen 60, and a semi-permeable membrane 64 closing the lower end of the lower cylindrical tube 58.

The lower cylindrical tube 58 has external threads on its upper end engaging the internal threads at 36 on the upper cylindrical tube 34 of the separating column 28 to form a continuous opening along the longitudinal axis of the frame 12 for migration of the molecular species of the sample 44 and is supported on the second inwardly extending flange 22 at its lower end by an o-ring 68 which also closes the bottom of the water jacket within the frame 12 to prevent the escape of coolant. The semipermeable membrane 64 supports the collecting medium 62, being held to the outer surface of the lower cylindrical tube 58 at its edges by an o-ring 66 to close the bottom end of the lower cylindrical tube 58.

To provide contact between the source 52 of positive electrical potential and the bottom of the collecting medium 62, the lower buffer section 48 includes a cylindrical container 70 having a circular bottom wall and tubular side walls opening upwardly toward the bottom of the collecting column 46. A buffer solution 72 is within the container 70, filling it to a level where it contacts the semipermeable membrane 64 and an electrode connected to the source 52 of positive electrical potential which electrode is immersed in the buffer solution.

To permit the separated molecular species to be removed from the collecting column 46 for observation or collection in different containers in one embodiment and to provide an overflow tube in all embodiments, the fluid exit section 54 includes a channel 74 communicating with the top of the collecting column 62 and extending angularly through the walls of the upper cylindrical tube 34. A tube 76 communicates with the channel 74 at a counterbore in the side of the cylindrical outer tube 34 and extends through the wall 18 at an angle so that the collecting medium can be forced out of the collecting section 16 through the channel 74 and the tube 76 into another receptical for observation or into containers, with each molecular species being separated into a different container and under other circumstances to enable the collecting medium to fill the collecting column even if its level drops, being replenished from the tube 76 which extends above the porous screen 60.

The fluid control section 50 of the collecting section 16 includes a flexible hose 78, a glass tube 80 extending through the wall of the lower cylindrical tube 58 to communicate at one end with the bottom of the collecting column 62 and at the other end with the flexible hose 78, a three-way valve 82 communicating with the flexible hose 78 to control the flow of fluid therethrough, a syringe 84 communicating with the flexible hose 78, and a dense fluid 86 in the syringe 84 whereby the syringe 84 can force the dense fluid 86 into the bottom of the lower cylindrical tube 58 to float the density gradient column through the fluid exit section 54.

The three-way valve 82 may be positioned to: (1) bring a density gradient former (not shown) into communication with the bottom of the collecting column 62 through the flexible hose 78 and the glass tube 80 thereby establishing a density gradient in the lower cylindrical tube 58; (2) bring the syringe 84 into communication with the bottom of the lower cylindrical tube 58 to force a dense liquid 86 beneath the collecting medium and thus force the collecting medium through the exit section 54; and (3) seal or close the flexible hose 78.

In FIG. 3, there is shown a portion of a fractionating apparatus 110 that is used in connection with the electrophoresis apparatus 10 to collect the different molecular species in different containers such as the test tubes 112, 114, 116 and 118 shown in FIG. 3. This apparatus may be part of conventional fractionating apparatus such as the apparatus disclosed in the aforementioned U.S. Pat. Nos. 3,151,639 and 3,453,200.

To deposit each of the different molecular species in different ones of the test tubes 112-118, the fractionating apparatus 110 includes a concentration sensor 120 and a section of the glass tubing 77 (FIGS. 2 and 3) formed into a downspout 122 at one end and communicating at its other end (not shown) with either the tube 76 or the top of the collecting column 46 to receive the collecting medium 62. The concentration sensor 120, which may be any suitable type such as one of those described in connection with the optical cell in the aforementioned patents, is positioned around the glass tube 77 to detect the different zones having different molecular species as they flow upwardy through the tube 77 so that each molecular species may be deposited into a different one of the test tubes 112–118, if desired, by moving the test tubes after each zone is deposited.

In FIG. 4, there is shown auxiliary apparatus 124 which may be used with electrophoresis apparatus 10 instead of or with the portion 110 of the fractionating apparatus shown in FIG. 3. The auxiliary apparatus 124 is useful in observing the separated zones containing different molecular species.

The auxiliary apparatus 124 includes a reservoir 126 connected to the glass tube 77 above the concentration sensor 120 by a stopper 128. With this arrangement, the collecting medium 62 is moved into the reservoir to observe the zones. If the zones having the different molecular species are not separated sufficiently for collection or if it is desired to repeatedly scan the collecting medium at the same or with different wavelengths of light, the collecting medium 62 (FIG. 2) is returned to the collecting column 46 by pulling the plunger of the syringe 84 to remove some of the dense liquid 86 from the collecting column 46. With the collecting medium back in the collecting column 46, the separation of the molecular species may be increased by further electrophoresis in the collecting column or the collecting medium may be moved back into the reservoir to scan it again.

OPERATION OF ELECTROPHORESIS APPARATUS

Before operation, the electrophoresis apparatus 10 (FIG. 2) of this invention is assembled with the separating medium 38 in place within the separating column 28, with the separating column 28 fastened to and above the collecting column 46, with the collecting medium 62 in place within the collecting column 46, and with the sample above the separting medium 38.

To insert the separating medium 38 into the separating column 28, a porous anchoring screen 60, which may be a polyester screen, is inserted into the tube 34 of the separating column 28 as shown in FIG. 5 and the separating medium 38 is pipetted into the tube 34 as shows in FIGS. 6 and 7. The separating medium is anchored in place by the anchoring screen 60 because the walls of the tube 34 are generally of acrylic and the separating medium does not adhere to them well.

To insert the anchoring screen 60, an expandable plug 130 is inserted in one end of the tube 34 to a location adjacent to the annular anchoring groove 132 within the walls of the tube 34. With the expandable plug 130 in place, the screen 60 is inserted into the tube 34 from the other end and pressed into the tube 34 until it snaps into the annular groove 132 which holds it in place.

To insert the separating medium, which may be a polyacrylamide gel, into the tube 34, the tube is inverted over the expandable plug, with the expandable end of the plug being located where the top of the gel should be. The expandable plug is tightened in place within the tube 34 and is mounted to a ring stand clamp 136 as shown in FIGS. 6 and 7 to hold the separating column 28 and water jacket 12 in place in an inverted position.

With the separating column 28 inverted, an unpolymerized gel solution is inserted into the tube 34 through a pipette 138 as shown in FIG. 6, with the gel being added through the screen 60 until it overflows through the overflow tube 140 just above the screen 60. In pipetting the gel, the screen 60 is touched by the tip of the pipette 138 so that the gel flows through one portion of the screen with air escaping from a different portion of the screen.

After the gel has reached the desired level above the screen 60, adhering gel solution is removed from the overflow tube 76 with a Pasteur pipette and a rubber bulb, and a piece of clear silicone rubber tubing 140 is inserted over the overflow tube 76 as shown in FIG. 7. With this tube, water is slowly layered over the surface of the gel above the screen 60 to form a perfectly flat layer. As an alternative, a special acrylic plug may be inserted to level the surface of the separating medium.

With the surface of the separating medium smooth, the separating medium is polymerized by any method known in the art. After polymerization, the silicone rubber tube 140 is removed from the overflow tube 176 and the water is removed from the gel surface. The expandable plug 130 is then loosened and removed from the central column leaving a flat upper surface in the separating medium 38 within the tube 34.

With the gel in place, the tube 34 is threaded onto the top end of the tube 58 which is intended to contain the collecting medium 62. The semiporous membrane 64 closes the lower end of the lower cylindrical tube 58, being held near its periphery to the walls of the lower cylindrical tube 58 over which it is folded by the o-ring 66.

The collecting medium 62 is inserted into the collecting column 46 through the three-way valve 82, the flexible tube 78, and the tube 80 (FIG. 2), generally by a density gradient former. The collecting medium 62 is brought into intimate contact with the separating medium 38, with the air in the column escaping through the channel 74 in the upper cylindrical tube 34. An excess of the collecting medium may be forced into the channel 74 to be sure that the collecting medium 62 in the collecting column 46 is in intimate contact with the separating medium 38.

In selecting the collecting medium, the primary criterion is that the collecting medium must be capable of bulk flow. This characteristic permits the species to be efficiently collected according to the method of this invention. The particular medium is selected from among those capable of bulk flow. This characteristic permits the species to be efficiently collected according to the method of this invention. The particular medium is selected from among those capable of bulk flow to provide still better separation of some of the molecular species. Under some circumstances, it is possible to obtain the best separation of some of the molecular species in a sample by electrophoresis in the separating medium and the best separation of other species by further electrophoresis in the collecting medium.

In selecting the separating and collecting media, the changes in the mobility of the molecular species at the interface of the two media are also considered. By using a collecting medium that provides greater velocity to the migrating species than that provided by the separating medium, a further separation of the zones and a reduction in the concentration of the molecules of the species within the zones are achieved and by using a collecting medium that provides lower velocity to the migrating species, the distance between zones is reduced and the concentration within each zone is increased. Of course, the two media may provide the same velocity so that there is no such change at the interface between the media. Moreover, three or more media, each providing a different velocity may be included to provide increased separation. When three media are included, the central media may be relatively low in volume.

Before the electrophoresis is performed, the sample 44 containing the mixture of molecular species is deposited on top of the separating medium 38, the buffer solution is deposited in the upper and lower buffer sections 30 and 48 where it contacts the electrodes and the semipermeable membrane 64 to establish an electrical potential across the sample, the separating column and the collecting column. The mixture of molecular species is suspended in a dense liquid within the sample 44 so that it is not displaced from the top of the separating column 28 by the buffer solution 42.

To be sure that the collecting medium 62 is in intimate contact with the separating medium 38, the plunger of the syringe 84 may be depressed to force a dense liquid 86 into the bottom of the collecting column 46, where it floats the collecting medium 62 upwardly until it is in intimate contact with the bottom of the separating medium and has entered the channel 74.

After the electrophoresis apparatus has been prepared, an electric potential is applied across the separating column 28 and the collecting column 46 to cause the migration of the molecular species in the sample through the separating medium and the collecting medium. As the molecular species move through the separating medium, different species migrate at different rates and zones are formed, each containing different molecular species. Closely spaced molecular species are separated with high resolution by some solid or semi-solid separating media such as by certain polyacrylamides.

The spaced-apart zones formed in the separating medium migrate into the collecting medium while maintaining their identity as discrete zones.

After the zones have entered the collecting medium, they are normally scanned and collected. This may be accomplished by separating the separating and collecting sections and inserting the tube 77 (FIGS. 3 and 4) into the tube 58 of the collecting section to receive the collecting medium or by connecting the tube 77 to the tube 76.

Firstly, the zones are scanned to locate the zones of interest and to determine if the separation is complete. If the separation between zones is complete, the zones may be deposited in containers, and if not, the electrophoresis may be continued. To scan the zones, the plunger of the syringe 50 (FIG. 2) is depressed to force the dense liquid 86 into the collecting column 46, floating the collecting medium 62 with the zone or zones of interest in it through the exit section 54 and through the concentration sensor 120 (FIG. 4) into the reservoir 126. Later, the collecting medium can be returned for further electrophoresis if the zone of interest is not sufficiently separated or for scanning with the same or different frequencies of light.

Secondly, if the species of interest are sufficiently separated, each zone or each of certain zones or certain groups of zones may be deposited in a different container, after which, the molecular species in the zone or zones are removed from the collecting medium by dialyses or other suitable method.

One method of locating and depositing the zones in different containers is to remove the separating and collecting columns 28 and 46 from the electrophoresis apparatuses 10 and to unscrew the collecting column 46 from the separating column 28. The collecting medium 62 is then processed in a fraction collector of the type described in the aforementioned U.S Pat. Nos. 3,151,639 and 3,453,200, a portion of which is shown in FIG. 3 to deposit the zones or groups of zones in different containers. Before the separating and collecting columns 28 and 46 are removed from the electrophoresis apparatus 10, the water is drained from the water jacket in the frame 12.

Another method of locating and depositing the zone or zones of interest in a container or in different containers, usable with the embodiment of FIG. 2 when the apparatus of FIG. 3 is attached to the tube 76, is to depress the plunger of the syringe 50 (FIG. 2) to force the dense liquid 86 into the bottom of the collecting column 46. The dense liquid floats the collecting medium 62 upwardly, with the collecting medium flowing by bulk flow without intermixing the different zones within it, through the concentration sensor 120, which may be an optical or chemical sensor, and through the downspout 122 into the tubes 122–118, the concentration sensor 120 moving the tubes so that the zone or zones or interest are deposited in different tubes and not intermingled.

Although a screen is described in the preferred embodiment, other structures may be used such as a plurality of straight bars. Essentially the structure must have a passageway communicating with the two portions of the separating column that are on opposite sides of the structure and must be at least rigid enough to be self supporting.

In an embodiment in which the collecting medium is a density gradient column, degredation of the gradient near the screen 60 by diffusion can be reduced by three measures, which are: (1) by including a relatively steep gradient (a gradient that changes in density by a relatively large percentage for each unit of measurement near the screen 60); (2) by protecting the apparatus from vibrations; and (3) by terminating operation of the apparatus just before the zones are to be moved into the collecting medium and inserting some dense fluid 86 from the syringe 50 into the bottom of the column to cause the top portion of the density gradient to be forced into the tube 76 and be replaced in the collecting section 16 by a density gradient that is not degraded before moving the zones into the collecting medium.

In embodiments using a granular collecting medium, the degradation of the collecting column near the membrane 60 is substantially reduced. However, to provide adequate bulk flow characteristics to columns including granular materials, a special technique should be used. In this technique, the granules are not displaced from the column into the fraction collector; but instead, the liquid electrolyte around the granules is removed from the granules and channeled into the fraction collector together with the separated zones, either by draining the electrolyte and zones of molecular species from the bottom or by displacing them in an upward direction by introducing a more dense liquid in the bottom of the column. It is also possible to wash the electrolyte from the granules during the draining of the electrolyte by applying another liquid to the top of the column.

Generally, a density gradient column or a column of granular material is selected for use as the collecting medium when it does not affect the separation of the molecular species of interest during electrophoresis, thus not disturbing the separation already accomplished in the separating medium. This is especially important under some circumstances when using a granular material, because a granular material provides a faster rate of migration to larger particles than to smaller particles, which is the reverse migration differential from that provided by a gel, and thus would disturb the separation accomplished in the separating column. Accordingly, the granular material should be selected to be completely out of the range of the molecular species of interest so as to not affect their migration rates.

Although a specific embodiment has been described with some particularity, many modifications and variations in the preferred embodiment are possible without deviating from the invention. Accordingly, it is to be understood that, within the scope of the appended claims, the invention can be practiced otherwise than as specifically described.

What is claimed is:

1. Apparatus for electrophoresis of a mixture of different molecular species comprising:
    a first housing adapted to contain a first anticonvection medium;
    a second housing adapted to contain a second anticonvection medium said second housing having first and second ends;
    said apparatus further comprising attachment means for permitting the first housing and said first end of said second housing to be easily attached to and separated from each other while permitting said first and second anticonvection media to be in intimate contact when said first and second housings are attached, whereby said second housing may be removed while said different molecular species are contained in it for additional processing of said second anticonvection medium;
    electric means for substantially separating by electrophoresis at least some of said different molecular species in said first anticonvection medium and for moving said separated molecular species by electrophoresis into said second anticonvection medium; and conduit means not moving fluid between a location outside said second housing and a location proximate said second end of said second housing without contacting said second medium near said first end of said second medium, whereby fluid may be introduced or removed from the second end of said second housing to change the position of said second anticonvection medium without substantially mixing the separated molecular species.

2. Apparatus according to claim 1 further comprising:
    a first anticonvection medium within said first housing;
    a second anticonvection medium within said second housing; and
    said second anticonvection medium differing from said first anticonvection medium at least by being more capable of bulk flow, whereby the collection of the separated molecular species is facilitated.

3. Apparatus according to claim 2 in which said first anticonvection medium is held in said first housing by a porous screen and said second anticonvection medium is held by a semipermeable membrane, said first housing being mounted above said second housing.

4. Apparatus according to claim 1 in which said first housing includes an annular groove adapted to hold a mesh for supporting said first medium.

5. Apparatus according to claim 4 in which said first housing includes an opening through its wall positioned between said annular groove and said attachment means, whereby said second medium may flow through said opening adjacent to said first medium.

6. Apparatus according to claim 5 further including a water jacket for cooling said apparatus and a tabulation communicating with said first housing through said opening at one end and passing through said water jacket, whereby its other end is available for receiving or passing said medium.

7. Apparatus according to claim 5 further including a plastic mesh adapted to be mounted within said annular groove.

8. Apparatus according to claim 7 in which said second housing includes a means for attaching semipermeable membrane closing the end remote from said attachment means.

9. Apparatus according to claim 8 in which said first housing includes means for fastening a semipermeable membrane to close its end which is remote from said attachment means.

10. Apparatus according to claim 9 further including means for holding a buffer solution so as to be separated from said first medium by said semipermeable membrane.

11. Apparatus according to claim 10 further including means for containing a buffer solution separated from said first housing by said first semipermeable membrane.

12. Apparatus according to claim 11 further including means for circulating said buffer solution.

* * * * *

UNITED STATES PATENT OFFICE
CERTIFICATE OF CORRECTION

Patent No. 3,855,111      Dated June 10, 1975

Inventor(s) William B. Allington

It is certified that error appears in the above-identified patent and that said Letters Patent are hereby corrected as shown below:

Column 1, line 48, delete "still".

Column 2, line 64, "of" is changed to --if--.

Column 3, line 9, "electrphoresis" is changed to --electrophoresis--.

Column 4, line 16, "and" is changed to --to--.

Column 7, line 1, "tabulation" is changed to --tubulation--.

Column 7, line 3, "tabulation" is changed to --tubulation--.

Column 7, line 6, "tabulation" is changed to --tubulation--.

Column 9, line 46, "separting" is changed to --separating--.

Column 9, line 52, "shows" is changed to --shown--.

Column 12, line 35, "122-118," is changed to --112-118,--.

Column 12, line 37, "or" is changed to --of--.

Column 13, line 58, "not" is changed to --for--.

UNITED STATES PATENT OFFICE
CERTIFICATE OF CORRECTION

Patent No. 3,855,111          Dated June 10, 1975

Inventor(s) William B. Allington          - 2 -

It is certified that error appears in the above-identified patent and that said Letters Patent are hereby corrected as shown below:

Column 14, line 33, "tabula-" is changed to --tubula- --.

Signed and Sealed this sixteenth Day of December 1975

[SEAL]

Attest:

RUTH C. MASON
*Attesting Officer*

C. MARSHALL DANN
*Commissioner of Patents and Trademarks*